United States Patent [19]

Kellie

[11] Patent Number: 5,048,753
[45] Date of Patent: Sep. 17, 1991

[54] PORTABLE ENGINE PREHEATING SYSTEM

[76] Inventor: Michael E. Kellie, HCO1-1605-Box 10, Kenai, Ak. 99611

[21] Appl. No.: 524,211

[22] Filed: May 15, 1990

[51] Int. Cl.$^5$ .............................................. B60H 1/02
[52] U.S. Cl. ........................ 237/12.3 C; 123/142.5 R
[58] Field of Search ................................ 237/12.3 C; 123/142.5 R; 126/358

[56] References Cited

U.S. PATENT DOCUMENTS

| | | | |
|---|---|---|---|
| 3,131,864 | 5/1964 | Young | 237/8 |
| 3,304,004 | 2/1967 | Hraboweckyj | 237/12.3 C |
| 3,400,700 | 9/1968 | Lindsey et al. | 123/142.5 |
| 4,348,992 | 9/1982 | Southard | 123/142.5 R |
| 4,520,769 | 6/1985 | Kratzer | 237/12.3 C |

Primary Examiner—Lloyd L. King

[57] ABSTRACT

A self-contained portable heating system for preheating the coolant in an internal combustion engine to aid in cold weather starting. The heater and associated fuel supply are mounted on a portable cart, and connected to an engine to be preheated by hand operated quick disconnect fittings.

The heating system incorporates thermal powered automatic controls to control the coolant temperature, and allow the heater to automatically start at a prescribed time. A pressurized gas burner having a mixing nozzle and baffle system, provides a clean burning stable heat source, even in windy or gusty conditions.

14 Claims, 4 Drawing Sheets

PORTABLE ENGINE PREHEATING SYSTEM

BACKGROUND OF THE INVENTION

A common problem for operators of heavy equipment, and other powered machinery, is cold weather starting of internal combustion engines, particularly diesel engines. In many cases, such as logging operations, rural road construction, or outlying farming operations, enclosed storage is nonexistent, or impractical. The resultant exposure of equipment to cold ambient temperatures during prolonged nonoperative periods tends to increase oil viscosity, reduce battery output, and makes the vaporization of fuel much more difficult. These effects combine to make cold weather starting of engines a prolonged and difficult task. In addition to the increased wear of batteries and starting motors, cold starts greatly increase the wear of internal engine components, due to poor initial lubrication. The common use of electric block heaters is often not possible, due to the lack of suitable electrical power.

A number of fuel gas fired engine preheaters have been proposed as a solution to the cold weather starting problems of internal combustion engines. These are exemplified by U.S. Pat. Nos. 3,131,864 to Young; 3,400,700 to Lindsey and Klancke (1968); 4,348,992 to Southard (1982); and 4,520,769 to Kratzer (1985). These inventions have not found wide spread use due to a number of limitations and problems in their operation.

A primary limitation of the prior art has been a lack of automatic controls to allow the engine heating apparatus to operate in a safe reliable manner, without the requirement of an external electrical power source. A further disadvantage has been relatively inefficient heat transfer from the ignited fuel heat source to the engine coolant. There has also been no viable method to enable a single self-contained engine heater to preheat a number of different engines at various times and at various locations.

OBJECTS AND SUMMARY OF THE INVENTION

Accordingly, it is an objective of this invention to provide an improved and novel engine coolant heater to facilitate cold weather starting of internal combustion engines, and which may be operated without the requirement of an external electrical power source.

Another objective of this invention is to allow safe and automatic operation of the engine heater with a minimum of supervision, through the novel use of thermal powered automatic controls and safety features.

Another objective of this invention is to provide a novel clean and efficient heat transfer from a fuel heat source to the engine coolant.

A further objective of this invention is to provide a simple and reliable engine coolant heater which is readily portable, and as a result may be easily connected to a number of different engines by the use of hand operated quick disconnect fittings. An added benefit of this arrangement is the problem, and expense, of finding a suitable location, and installing, an engine coolant heater on a particular piece of equipment is eliminated. Also, in many cases there is not sufficient space to make a fixed installation feasible. The heater is also removed from the adverse environmental conditions of vibration, dust, and other contaminants, associated with a fixed installation.

It will be understood that the size of the engine coolant heater, and associated components, may be varied to suit a particular application. The present embodiment provides a heat input to the connected engine coolant system of approximately 10,000 BTU's per hour. This has been found to provide a rapid preheat, even with large diesel engines and very cold ambient conditions.

DETAILED DESCRIPTION

Figure 1:
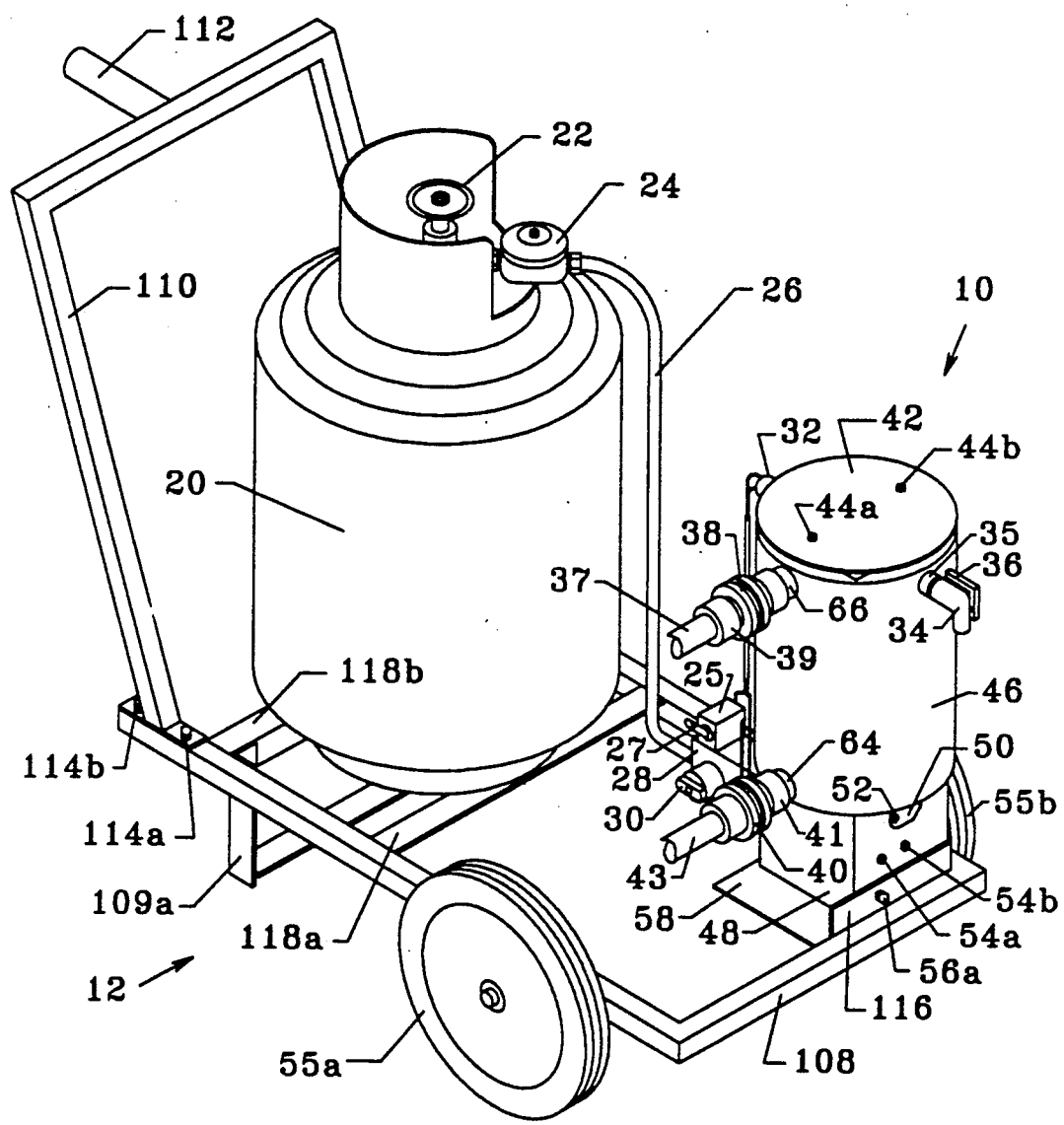
FIG. 1 is a perspective view of the novel gas fired fluid heater of the present invention, and a supply gas fuel tank, mounted to a portable wheeled cart.

Referring to FIG. 1, portable cart 12 has wheels 55a and 55b mounted to frame 108. Cart handle bracket 110 is secured to frame 108 with bolts 114a and 114b and with two similar bolts 114c and 114d on the opposite side (hidden from view by fuel tank 20). Cart handle 112 is attached to bracket 110 by suitable means, such as welding. Tank support brackets 118a and 118b are welded to lower cart frame 108. Support leg 109a and support leg 109b (hidden from view by fuel tank 20) are secured to frame 108 by suitable means, such as welding. Fuel tank 20 is secured to support brackets 118a and 118b by suitable mounting means.

Fuel tank 20 contains a combustible fluid or gas. Pressurized propane gas represents one suitable combustible gas. Tank 20 has shutoff valve 22 connected to the top outlet port, which controls flow of the combustible gas to regulator 24. Regulator 24 maintains a constant outlet gas pressure. In the case of propane gas, regulator 24 maintains an outlet gas pressure of approximately eleven inches of water column. Fuel supply conduit 26 connects the outlet port of regulator 24 to the inlet port of combination gas control valve 28.

Figure 2:
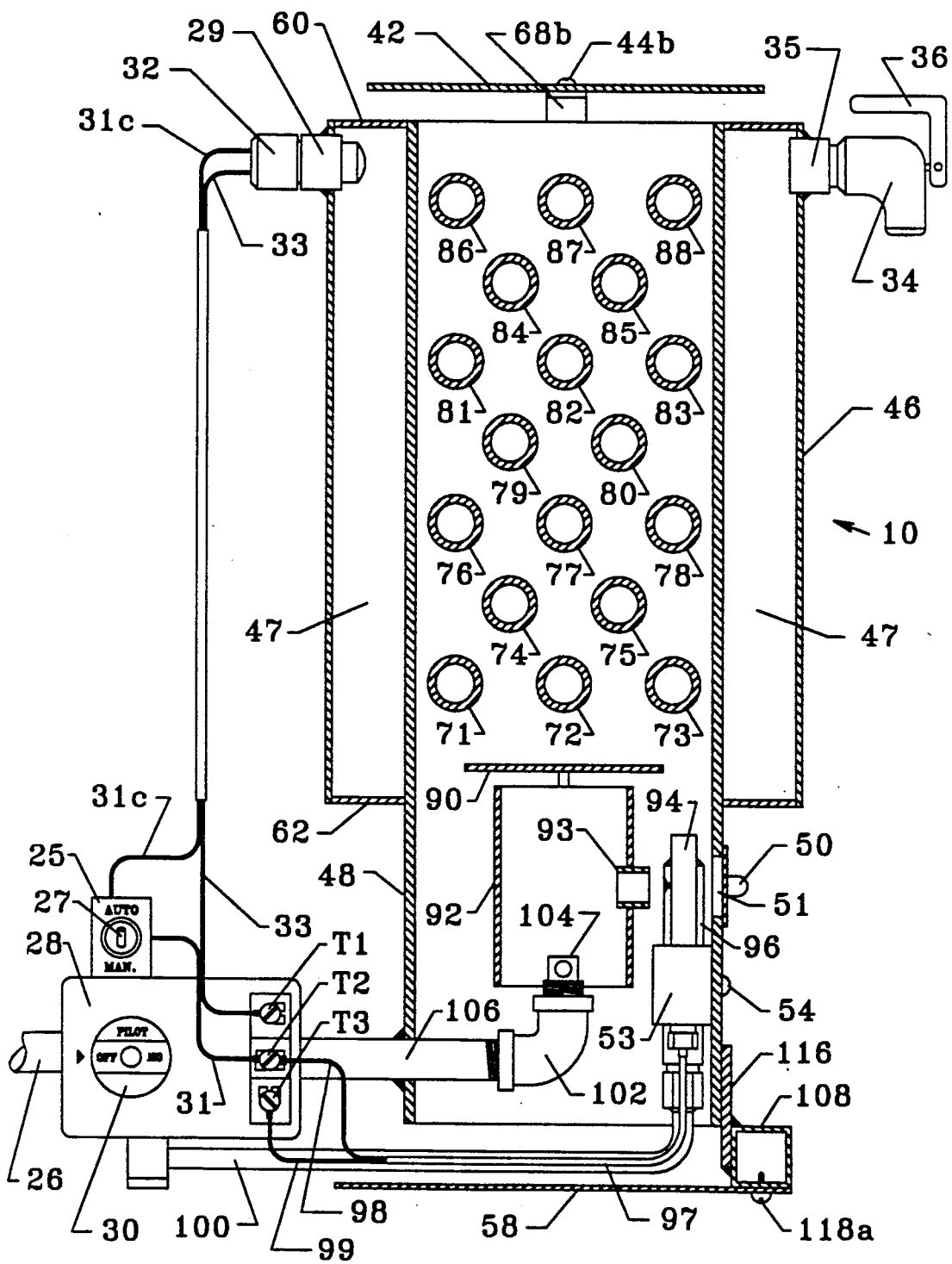
FIG. 2 is a cross-sectional view of the heater taken through the relief valve and temperature switch ports.
Figure 3:
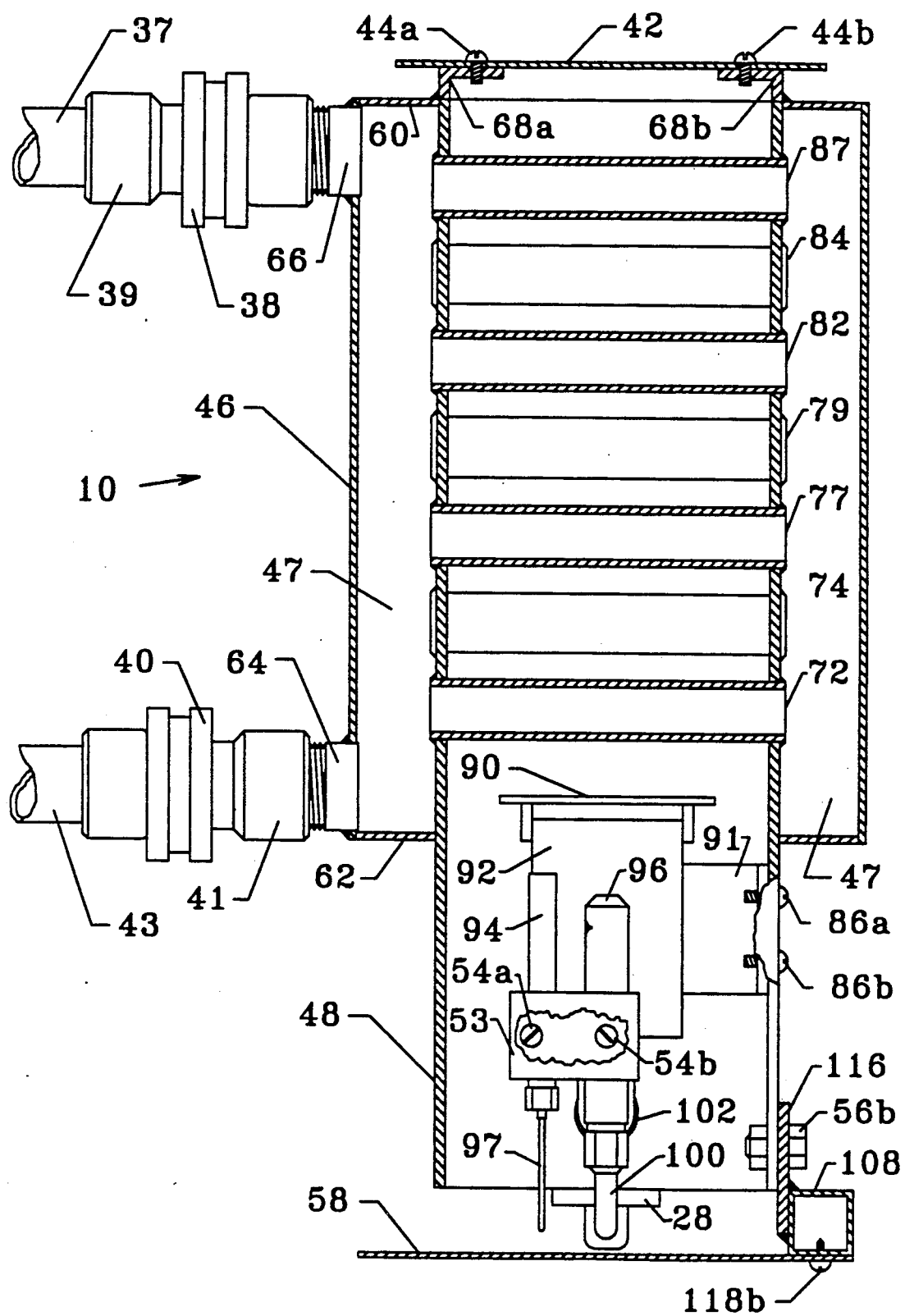
FIG. 3 is a cross-sectional view of the heater taken through the fluid inlet and outlet ports.

Referring also to FIGS. 2 and 3, mounting bracket 116 is secured to frame 108 by suitable means, such as welding. Fluid heater 10 is secured to mounting bracket 116 by bolts 56a and 56b, which pass through mounting holes in inner heat transfer tube 48 and bracket 116. Air baffle 58 is secured to frame 108 by screws 118a and 118b. This configuration provides an air inlet area along two sides of the bottom edge of tube 48.

Referring to FIGS. 2 and 3, inner heat transfer tube 48 is formed from an elongated tube section having a square cross section. Outer heat exchanger shell 46 is formed from an elongated cylindrical tube section. The top end of exchanger shell 46 is connected by end cap 60 to the top end of tube 48 by suitable means, such as welding. The bottom end of shell 46 is connected by end cap 62 to the outer wall of tube 48 by suitable means, such as welding. Tube 48, shell 46, end cap 60, and end cap 62 combine to form a liquid tight fluid heating chamber 47 between them.

Exchanger shell 46 has threaded port 35 communicating with the upper portion of fluid heating chamber 47. Pressure relief valve 34 is threaded into port 35 and fitted with a manual pressure relief handle 36. Valve 34 will open to vent if the pressure in chamber 47 exceeds the valve pressure setting. This provides additional protection against potentially dangerous pressure buildup in chamber 47. The operation of valve 34 may be tested at any time by raising handle 36. Valve 34 is set to relieve at a relatively low pressure, typically ten to fifteen pounds per square inch (p.s.i.).

Referring to FIG. 3, shell 46 has threaded fluid inlet port 64 and threaded fluid outlet port 66 communicating with chamber 47. Male quick disconnect fitting 41 is threaded to port 64. Female quick disconnect fitting 40 is connected to fitting 41. Coolant inlet hose 43 is connected to fitting 40. The other end of hose 43 is connected to a lower port in the coolant jacket of the engine to be heated (not shown). Female quick disconnect fitting 38 is threaded to port 66. Male quick disconnect fitting 39 is connected to fitting 38. Coolant outlet hose 37 is connected to fitting 39. The other end of hose 37 is connected to an upper port in the coolant jacket of the engine to be heated (not shown). The connection or disconnection of fittings 38 and 39 is simply accomplished by hand actuation. Fittings 40 and 41 operate in the same manner as fittings 38 and 39. Check valves in each of the fittings 38, 39, 40, and 41 open when the fitting halves are connected, and close when disconnected, to minimize coolant losses. It will be noted that the lower fitting 41 is of the male type, and attached to port 64. The upper fitting 38 is of the female type, and attached to port 66. This arrangement provides a positive method of ensuring the two coolant hoses from the engine are connected in the correct orientation. For optimum performance hoses 37 and 43 are located on the engine at an elevation above ports 64 and 66. The length of hoses 37 and 43 are kept to the minimum required, with no sags or kinks. Fittings 38 and 41 may also be connected to ports 64 and 66 by lengths of hose, similar to hoses 37 and 43. This allows fittings 39 and 40 to be located on, or near, the respective ports on the engine to be heated.

Figure 5:
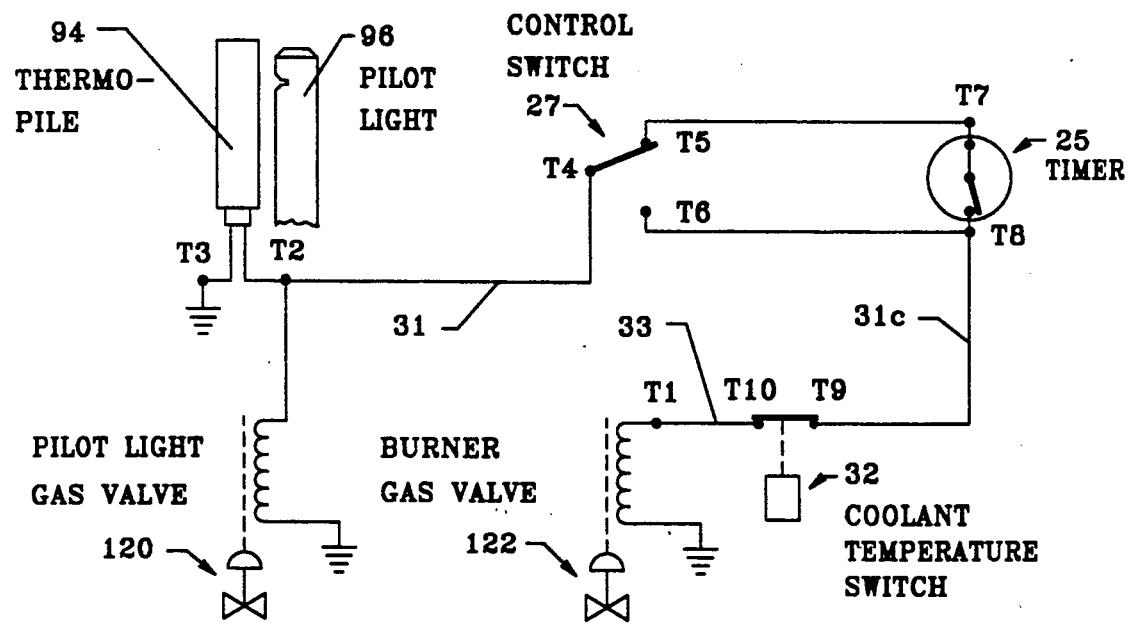
FIG. 5 shows an electrical circuit diagram for the electrical components of FIG. 1.

Referring to FIGS. 2, 3, and 5, combination gas valve 28 includes internal pilot light gas control valve 120 and burner gas control valve 122, both shown schematically in FIG. 5. Three position manual control valve 30 controls the flow of combustible gas from the inlet port of gas control valve 28 to control valve 120 and control valve 122. Placing valve 30 in the "PILOT" position will allow gas flow to the inlet of valve 120. Placing valve 30 in the "ON" position will allow gas to flow to both valve 120 and valve 122. Valve 120 and valve 122 are spring loaded to the closed position. Control solenoids on valve 120 and 122 open the respective valve when the proper electrical power is supplied. Electrical power for operation of valve 120 and valve 122 is generated by thermopile 94.

Mounting bracket 53 is secured to the lower portion of heat transfer tube 48 with machine screws 54a and 54b. Pilot light 96 and thermopile 94 are secured to mounting bracket 53. Thermopile 94 has two electrical conductors 98 and 99 enclosed in protective cover 97. Conductor 98 is connected to terminal T2 on gas valve 28 and conductor 99 is connected to terminal T3 on gas valve 28.

The outlet of valve 120 is connected to pilot light fuel supply conduit 100. Conduit 100 is connected to the base of pilot light 96. Placing valve 30 in the "PILOT" position and pressing inward will manually open valve 120, allowing gas to flow through conduit 100 to pilot light 96. Pilot light access cover 50 is secured to inner heat transfer tube 48 with machine screw 52. Screw 52 provides a light friction pivot fit for cover 50. Rotating cover 50 downward provides access to ignite gases from pilot light 96, with a match or other ignition source, through access port 51. Pilot light 96 has two burner orifices, one of the burner orifices is alined with port 93 in burner housing 92. The other burner orifice is directed toward thermopile 94. Thermopile 94 converts thermal energy from pilot light 96 to direct current electrical energy with a nominal voltage of 750 mV. After 30 to 60 seconds thermopile 94 will generate sufficient electrical energy. Valve 120 will then be held in the open position by current flow through terminals T2 and T3. The inward pressure on valve 30 may then be released. Valve 120 will remain in the open position as long as thermopile 94 continues to generate electrical energy, which is dependent on the continued thermal energy input from pilot light 96. Access door 50 is rotated to the closed position to cover port 51.

Completion of the electrical circuit for the control solenoid on valve 122 is dependent on control switch 27, timer 25, and temperature switch 32. Conductor 31 is connected to terminal T2 on valve 28 and terminal T4 on control switch 27. Placing switch 27 in the "AUTO" position connects terminal T4 to terminal T5. Terminal T5 is connected to terminal T7 on timer 25. Timer 25 may be set to connect terminal T7 to terminal T8 at a particular time. Placing switch 27 in the "MAN." position connects terminal T4 to terminal T6. Terminal T6 is connected to terminal T8, thus bypassing timer 25. Terminal T8 is connected to terminal T9 on temperature switch 32 by conductor 31c. Switch 32 is threaded into port 29 located on exchanger shell 46. Port 29 is in communication with the upper portion of fluid heating chamber 47. Switch 32 is a temperature actuated switch, with normally closed contacts. Terminals T9 and T10 are connected to the contacts on switch 32. The temperature sensing element of switch 32 extends through port 29 into chamber 47. If the temperature of the temperature sensing element exceeds the set point temperature of switch 32, the switch contacts will open. The switch contacts will again close when the sensing element is below the set point temperature. The set point temperature is set at a suitable value, such as 180 degrees Fahrenheit. Terminal T10 is connected to terminal T1 on valve 28 by conductor 33. Valve 122 is connected to terminal T1 and terminal T3.

The outlet port of control valve 122 is connected to burner fuel supply conduit 106. Conduit 106 passes through a hole in the lower portion of inner heat transfer tube 48, and is secured by welding, or other suitable means. This embodiment provides a mounting support for fuel control valve 28, which is threaded to conduit 106. The outlet end of conduit 106 is fitted with elbow 102. Elbow 102 has mixing nozzle 104 threaded into the outlet end. Conduit 106 is fixed so as to place the outlet of nozzle 104 in the center of tube 48.

Figure 4:
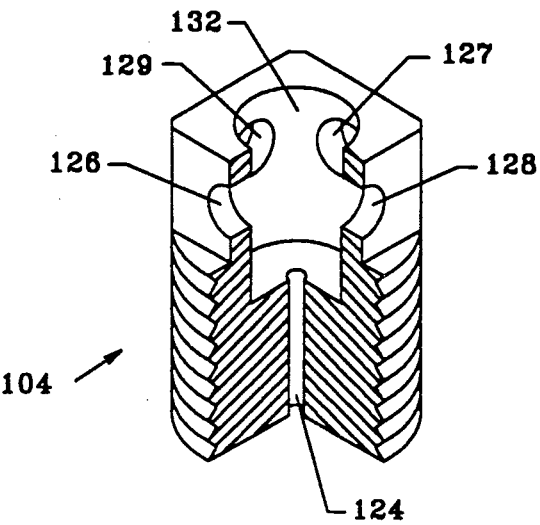
FIG. 4 is a cut-away view of the burner mixing nozzle.

Referring to FIG. 4, nozzle 104 has a concentrically located gas orifice 124 which discharges into mixing chamber 132. Four air inlet ports 126, 127, 128, and 129 are also in communication with mixing chamber 132. During operation supply gas flows through orifice 124 into the base of chamber 132 and then exits the top of chamber 132. The flow of supply gas creates a lower pressure in chamber 132 relative to the surrounding atmospheric air pressure. This low pressure results in a flow of air through ports 126, 127, 128, and 129 into chamber 132. The supply gas and incoming air mix in chamber 132 in a turbulent manner, which aids the overall combustion process. The air and gas mixture exits through the outlet of chamber 132 into the inlet of burner housing 92.

Referring to FIGS. 2 and 3, burner housing 92 is an elongated cylindrical tube with an open inlet end located concentrically in space with the outlet of nozzle 104. Burner housing mounting bracket 91 is welded to housing 92 and secured to tube 48 with machine screws 86a and 86b. As the gas air mixture exits nozzle 104 into the inlet of housing 92 the flow induces an additional flow of air into the inlet of housing 92. The vertical location of nozzle 104 relative to the inlet of housing 92 may be varied to control the gas to air ratio for combustion purposes. Placing nozzle 104 somewhat farther into housing 92 will result in a richer mixture. Removing nozzle 104 somewhat will give a leaner mixture. A position with ports 126, 127, 128, and 129 just above the bottom edge of housing 92 has been found to give generally good operation. As the gas air mixture flows upward in housing 92 it is ignited by a flame from pilot light 96 through port 93.

Burner exhaust baffle 90 is a square plate spaced from, and centered over, the outlet end of burner housing 92 by welded tabs. The hot exhaust gases exit through the vent space between the outlet end of housing 92 and baffle 90. Each of the four outer edges of baffle 90 are parallel with, and spaced from, one of the four inner walls of tube 48. The shape and orientation of baffle 90 results in an efficient flow pattern of hot exhaust gases toward the exchanger heat transfer surfaces. Baffle 90 also stabilizes the flame pattern in housing 92, particularly in windy or gusty conditions.

Positioned above baffle 90, in the staggered pattern shown, are elongated cylindrical cross-flow heat transfer tubes, 71 through 88. Tubes in this pattern have been found to maximize heat transfer from the hot exhaust gases to fluid heating chamber 47, while minimizing restriction to the hot gas flow. The opposing ends of tubes, 71 through 88, pass through opposing walls of tube 48 into chamber 47. Each end of tubes 71 through 88 are seal welded, or otherwise secured, to tube 48 to form a fluid tight connection. The inner annulus of tubes 71 through 88 is in communication with chamber 47. The square shape of tube 48 provides an increased heat transfer surface area, and easier machining of the holes for tubes 71 through 88, compared to a circular or other oval shape.

Mounting brackets 68a and 68b are secured to tube 48 by welding, or other suitable means. Exhaust baffle 42 is secured to brackets 68a and 68b by machine screws 44a and 44b. A vent space between baffle 42 and the outlet of tube 48 is maintained by brackets 68a and 68b.

The combination of nozzle 104, housing 92, and baffle 90 results in a clean, stable, and efficient burning of the supply gas. Combustion of the gases is completed before contact with the cooler walls of tube 48 or tubes 71 through 88. If combustion of the gases is not completed before contact with these cooler surfaces an inefficient heater results. In addition, a noxious odor from the unburned gases is developed. The unburned gases also deposit, and cause an objectionable buildup which reduces heat transfer, on the walls of tube 48, tubes 71 through 88, and baffle 42.

Exhaust baffle 42 and air baffle 58 contribute to stable operation of the burner in windy or gusty conditions. It has been found that baffle 42 produces an overall reduced pressure in the vent area in response to drafts. Drafts near the inlet of the heater are blocked in two directions by frame 108 and bracket 116. It will also be noticed that the inlet area under the heater is bounded on two sides by frame 108, and on the bottom by baffle 58. It has been found that drafts which enter the inlet area from behind frame 108 produce a net positive pressure in the inlet area under the heater. The turbulence of the inlet air stream is also reduced prior to reaching the base of housing 92. Thus the gases of combustion continue to move up and out the vent area, avoiding extinguishing the burner flame.

From the description above, several advantages and safety features of the present invention become evident:

(a) The portable nature of the heater allows it to be easily transported, positioned, and connected for use, even at remote site locations.

(b) The heater is completely self-contained, and requires no external source of electrical power.

(c) A single heater may be used to preheat a number of different pieces of equipment, by the simple use of economical quick disconnect fittings.

(d) The heater may be set to automatically start at a particular time, thus saving fuel and equipment preparation time.

(e) Loss of the pilot light flame will stop all gas flow to the heater.

(f) Temperature of the heated fluid is automatically controlled, to prevent potentially dangerous temperature and pressure conditions.

(g) A pressure relief valve provides additional protection against uncontrolled pressure buildup.

(h) The heater operates in a clean efficient and reliable manner, even in windy conditions.

OPERATION

The heater may be transported to the general location for use by any convenient means, such as the back of a light truck. The heater unit may then be lifted out, and set on wheels 55a and 55b and legs 109a and 109b. Gripping handle 112, and lifting upward slightly, the heater is easily wheeled next to the equipment to be preheated. The equipment will have a hose 37 of the correct length connected to an upper port in the engine coolant chamber, with a male quick disconnect fitting similar to 39 attached. A lower port of the engine coolant chamber will have a hose 43 of the correct length with a female quick disconnect similar to 40 attached. Fitting 39 is connected to the upper coolant outlet port of the heater by fitting 38. Fitting 40 is connected to the lower coolant inlet port of the heater by fitting 41. Handle 36 on relief valve 34 is lifted momentarily to verify proper operation of valve 34.

Valve 22 at the top of tank 20 is opened, allowing supply gas to flow through regulator 24 to gas valve 28. Cover 50 is rotated downward, providing access to pilot light 96 through port 51. Control valve 30 is rotated to the "PILOT" position, and pressed inward to allow gas flow to pilot light 96. A match, or other ignition source, is extended through port 51, igniting the gas flow from pilot light 96. After 30 to 60 seconds valve 30 is released.

If it is desired to have the heater automatically begin operation at a later time, timer 25 is set to the desired starting time. Control switch 27 is then placed in the "AUTO" position, and valve 30 is rotated to the "ON" position. Operation of the heater will commence when the selected time is reached. If switch 27 is placed in the "MAN." position, operation of the heater will begin as soon as valve 30 is rotated to the "ON" position.

Thermal energy from the hot exhaust gases is transferred to the engine coolant by inner heat transfer tube 48 and heat transfer tubes 71 through 86. As the coolant is heated a thermo-siphon effect is established. Warm coolant rises in fluid heating chamber 47, and flows to the engine coolant jacket through port 66, fittings 38 and 39, and hose 37. Cold coolant flows into chamber 47 through hose 43, fittings 40 and 41, and port 64.

If the coolant temperature in chamber 47 exceeds the setpoint of switch 32, gas flow will be cutoff to nozzle 104. Pilot light 96 will remain in operation. When the coolant temperature falls below the setpoint of switch 32 gas will again flow to nozzle 104, and be ignited by pilot light 96. Pressure relief valve 34 provides secondary protection in the event of uncontrolled over-temperature, and associated pressure increase, in chamber 47. If pilot light 96 should be extinguished for any reason, all gas flow through valve 28 will be cut-off.

When the desired degree of engine preheat has been reached, valve 30 is rotated to the "OFF" position. This will stop gas flow to nozzle 104 and pilot light 96. Valve 22 at the top of tank 20 is closed. Fitting 37 is disconnected from fitting 38 and fitting 40 is disconnected from fitting 41. The heater may then be repositioned to preheat another piece of equipment, or moved to a storage area until the next use.

Accordingly, the reader will see that the portable engine heater of this invention can be operated easily and safely, without the requirement of an external electrical power supply. In addition, a single portable heater may be used to preheat a number of different engines, by the use of economical quick disconnect fittings. The separate and external nature of the heater also eliminates the problem of installing the heater, and associated fuel supply tank, on equipment where space may be a problem. The heater is also not exposed to adverse vibration and contaminants, which are common to the operation of many types of equipment. Furthermore, the portable engine heater has the additional advantages in that:

(a) The novel heat exchanger design provides an efficient transfer of heat from the supply gas to the engine coolant system.

(b) The novel burner and baffle system combine to make a an efficient and clean burning heater, which will operate reliably in windy or gusty conditions.

(c) The heater may be set to automatically start at a particular time, thus saving fuel and equipment preparation time.

(d) In the event the pilot light flame should be extinguished during operation of the heater, all gas flow to the heater will be shutoff.

(e) Temperature of the heated fluid is automatically controlled, to prevent potentially dangerous temperature and pressure conditions.

(f) Additional protection against uncontrolled pressure buildup is provided by a pressure relief valve.

Although the description above contains many specificities, these should not be construed as limiting the scope of the invention but merely providing illustration of some of the presently preferred embodiments of this invention. For example the engine coolant may be circulated through the heater and engine block by a thermostatically controlled pump. The heater may be mounted in a permanent location on a particular piece of equipment. The heater may be used as a heat source for other fluids, in addition to the above stated engine coolant heating. The shape of the outer exchanger shell may be other than cylindrical, such as square. A built-in ignition source, such as a piezo-electric or battery powered ignitor, may be used to light the pilot light.

Thus the scope of the invention should be determined by the appended claims and their legal equivalents, rather than by the examples given.

What is claimed is:

1. A heating system for heating a fluid including:
   (a) an elongated inner heat transfer tube means surrounded by an enclosed fluid heating chamber means, said fluid heating chamber means having an upper high temperature fluid outlet and a lower low temperature fluid inlet,
   (b) a plurality of elongated cross flow heat transfer tube means, said cross flow heat transfer tube means extending through said inner heat transfer tube means and communicating with said enclosed fluid heating chamber means,
   (c) said lower low temperature fluid inlet means connected to a lower port on a fluid storage means and said upper high temperature fluid outlet means connected to an upper port on said fluid storage means,
   (d) a heating means whereby the fluid in said fluid heating chamber means is heated by heat transfer from the walls of said inner heat transfer tube means and the walls of said plurality of cross flow heat transfer tube means, and said heated fluid circulates from said fluid storage means throughout said fluid heating chamber means and said heat transfer tube means and back to said fluid storage means.

2. The invention of claim 1 wherein said plurality of cross flow heat transfer tube means are normal to two opposing walls of said inner heat transfer tube means, said plurality of cross flow heat transfer tube means extending through said opposing walls so as to be in communication with said fluid heating chamber means.

3. The invention of claim 1 wherein said inner heat transfer tube means extends below the bottom of said fluid heating chamber means, said heater means enclosed within said inner heat transfer tube means extension.

4. The invention of claim 1 wherein an exhaust baffle means is located aposition and spaced from the outlet end of said inner heat transfer tube means and an air baffle means is located aposition and spaced from the inlet end of said inner heat transfer tube means, said exhaust baffle means cooperating with said air baffle means to prevent extinguishment of said heater means in windy or gusty conditions.

5. The invention of claim 1 wherein said fluid inlet means and said fluid outlet means are connected to said fluid storage means by quick disconnect coupling means.

6. The invention of claim 1 wherein said fluid heating chamber means has a pressure relief valve means communicating with said fluid heating chamber means.

7. The invention of claim 1 wherein the fluid heater means is mounted to a portable cart means.

8. A burner means for a pressurized flammable gas including:
   (a) an elongated air and gas mixing nozzle means including a gas orifice means at one end, and an elongated mixing chamber means at the opposite end, (b) a plurality of air inlet port means in said mixing chamber means for supplying primary air into said mixing chamber means, (c) an elongated burner housing means having an open inlet end located aposition the outlet of said mixing chamber means, said open end admitting an air and gas mixture from said mixing chamber means and a flow of secondary air.

9. The invention of claim 8 wherein a burner baffle plate means is located aposition the outlet of said burner housing means, said burner baffle plate means spaced so as to form a flow passage for hot gases between said burner baffle plate means and the outlet of said burner housing means.

10. The invention of claim 8 wherein said burner housing means has a port to allow an ignition means to ignite said air and gas mixture in said burner housing means.

11. The invention of claim 8 wherein the position of said mixing nozzle means relative to the inlet of said burner housing means may be varied by adjustment means, the change in position of said mixing nozzle means corresponding to a change in the amount air in said air and gas mixture.

12. The invention of claim 8 wherein said gas is a pressurized tank of propane gas.

13. A thermal powered system for automatic control of a heater means for the coolant of an internal combustion engine including:

(a) a burner means for providing thermal energy to said coolant, and a pilot light means, said pilot light means providing an ignition source for said burner means and a thermal energy source for a thermal generator means, (b) a combination gas valve means powered by electrical current from said thermal generator means, said gas valve means having a pilot light gas valve means and a burner gas valve means, (c) said pilot light gas valve means allowing gas flow to said pilot light means when supplied with said electrical current, said pilot light gas valve means stopping gas flow to said pilot light means upon interruption of said electrical current, (d) a coolant temperature switch means, said temperature switch means in series with said electrical current, to said burner gas valve means, said temperature switch means in thermal contact with said coolant in said heater means, said temperature switch means allowing electrical current flow when said coolant temperature is below a setpoint value of said temperature switch means, said temperature switch means interrupting said electrical current when said coolant temperature exceeds said setpoint value of said temperature switch means, said burner gas valve means allowing gas flow to said burner means when supplied with said electrical current, said burner gas valve means stopping gas flow to said burner means upon interruption of said electrical current.

14. The invention of claim 13 further including a timer means which may be placed in series with electrical current from said thermal generator means to said burner gas valve means by a electrical switch means, said timer means controlling electrical current flow to said gas burner valve means.

* * * * *